United States Patent [19]

Flood

[11] Patent Number: 5,627,745
[45] Date of Patent: May 6, 1997

[54] PARALLEL PROCESSING IN A MULTITASKING INDUSTRIAL CONTROLLER

[75] Inventor: Mark A. Flood, Mayfield Heights, Ohio

[73] Assignee: Allen-Bradley Company, Inc., Milwaukee, Wis.

[21] Appl. No.: 434,435

[22] Filed: May 3, 1995

[51] Int. Cl.[6] .......................... G05B 15/00; G05B 19/18
[52] U.S. Cl. ............................. 364/131; 364/141
[58] Field of Search .................... 364/131, 141, 364/800; 395/700, 375, 650; 340/172.5

[56] References Cited

U.S. PATENT DOCUMENTS

| | | | |
|---|---|---|---|
| 3,789,365 | 1/1974 | Jen et al. | 340/172.5 |
| 3,905,025 | 9/1975 | Davis et al. | 340/172.5 |
| 4,152,761 | 5/1979 | Louie | 364/200 |
| 4,642,756 | 2/1987 | Sherrod | 364/200 |
| 4,736,318 | 4/1988 | Delyani et al. | 364/200 |
| 4,954,948 | 9/1990 | Hira et al. | 364/200 |
| 5,193,189 | 3/1993 | Flood et al. | 395/650 |
| 5,339,425 | 8/1994 | Vanderah et al. | 395/700 |
| 5,465,335 | 11/1995 | Anderson | 395/375 |
| 5,469,571 | 11/1995 | Bunnell | 395/700 |

*Primary Examiner*—Paul P. Gordon
*Assistant Examiner*—Monica Lewis
*Attorney, Agent, or Firm*—Michael A. Jaskolski; John M. Miller; John J. Horn

[57] ABSTRACT

A method and apparatus for providing multitasking of a plurality of requests queued as a list in a single task of an industrial controller, each request including one or more separate segments. State information relating to each request being minimal at the end of each segment. The method processing the requests on a round-robin basis, interrupting each request only at the end of each segment so as to minimize the memory required to store the state information.

14 Claims, 7 Drawing Sheets

PARALLEL PROCESSING IN A MULTITASKING INDUSTRIAL CONTROLLER

FIELD OF THE INVENTION

The present invention relates to industrial controllers for the "real-time" control of industrial processes, and in particular, to an operating system for an industrial controller that allows multiple tasks to be executed with apparent simultaneity.

BACKGROUND OF THE INVENTION

Industrial controllers are special purpose computers used for controlling industrial processes in manufacturing equipment. Under the direction of a stored program, an industrial controller examines a series of inputs reflecting the status of a controlled process and changes outputs affecting control of the process.

Industrial controllers are frequently programmed in a "relay ladder" language where instructions are represented graphically by "contacts" and "coils" of virtual relays connected and arranged in ladder-like rungs. This relay ladder language, with its input contacts and output coils, reflects the emphasis in industrial control on the collection and transmission of large numbers of inputs and outputs. The relay ladder language also reflects the fact that most industrial control is "real time." That is, an ideal industrial controller behaves as if it were composed of multiple relays connected in parallel ladder rungs to produce outputs in essentially instantaneous response to changing inputs.

In reality, however, the parallel relay-like structure of a ladder diagram program is, in fact, executed sequentially one step at a time. The appearance of parallel operation is obtained by employing an extremely fast processor in the execution of the sequential program.

During the industrial control process, an industrial control processor must perform many different tasks in order to support an industrial process. As many control processes are extremely complex, normally a processor receives a plurality of tasks for concurrent performance. Thus, most processors include a scheduler to store pending tasks while an active task is performed.

The scheduling of several distinct tasks in a conventional computing environment may be undertaken through a number of different timing schemes. For example, a time sharing arrangement in which tasks are assigned priorities and high priority tasks cause the suspension of lower priority tasks for an indefinite period of time may be employed.

In this type of scheme, priority can be based on a number of different characteristics including estimated execution time of the task, estimated amount of I/O activity needed to complete the task, the tasks current resource allotment, the amount of total waiting time, and how important task completion is to the overall industrial operation being controlled.

Another approach used in conventional computing is that of time slicing where each task is given a fixed slice of the central processor's time on a round-robin basis. This approach assures that each task receives a predictable portion of the processor time.

Yet another alternative is a prioritized round-robin queue in which high priority tasks are given relatively larger slices of the central processors time than low priority tasks on a round-robin basis. This approach assures that high priority tasks are performed quickly but that low priority tasks are eventually performed.

In priority-based time sharing schemes, task performance switching can be either preemptive or non-preemptive. Where switching is non-preemptive, if a process arrives with higher priority than the running process, it must wait until the running process relinquishes the processor. When preemption is permitted, a higher priority arrival interrupts the running process's execution and takes control of the processor itself. The preempted process is returned to a pending queue.

In complex control schemes, various tasks of similar importance are often assigned identical priority, tasks sharing the same priority being performed on a round-robin basis. For example, program supporting requests, user background routines, and system support routines, might all share a level 1 priority and share processing resources in a time-slice, round-robin manner. In such a system, once a task begins to run, it is only stopped when it places itself in an in-active state to wait for some event or when a higher priority task needs to run.

In addition to controlling an industrial operation, typical industrial controllers provide means whereby one or more operators can analyze, edit, or search stored programs. This ability to demand and perform operator requests is a requirement for most industrial controllers. For example, where the process prescribed by a ladder diagram is not precisely tuned to specific controlled equipment, or where a new piece of equipment is added to the controlled equipment after the ladder diagram is entered, an operator must have some means to edit the program.

Many schedulers are programmed to queue all requests by operators for ladder diagram program monitoring, searching, and editing, to a single program support task forming a linked list for sequential first-in-first-out (FIFO) processing. Other system requests are often grouped in similar tasks for FIFO processing.

Unfortunately, while sequential execution maintains the integrity of program files, where such execution is required, no other monitor, search or edit operations can occur until an active request is completely performed.

For example, where one user tries to do an edit or a program search while another user is performing a program search operation, the edit or second search request is queued until the first search is completed. Where the first search is long, the second search request or edit may be queued for many minutes. This despite the fact that the second search or edit might only require a few milliseconds of processor time to perform. For this reason, sequential execution of requests within a single task have become problematic in many operating systems. While such delays are undesirable in completion of any request, they are particularly inconvenient in the case of monitor, search, and edit requests where a human operator must wait for request results.

One way to overcome such delays would be to provide a task based preemptive second level of priority, the highest priority within the task being given to the request having the shortest remaining operating time. Thus, when a short request is queued, that request would take priority over all long search, monitor, or edit request queued or being performed.

Another possible solution would be to create a separate priority for each task, giving each request within a task identical priority and allowing the requests to operate on a time slice round-robin basis. For example, each request might be given 0.2 msec of operating time before being preempted and re-queued to await another time slice after the other requests are each processed for 0.2 msec each.

Unfortunately, both of these approaches require a large amount of memory to store state information relating to interrupted requests. Where a long search request is preempted, in addition to storing request identifying information, the system must also store detailed data identifying the location of the file being searched and the interrupt point in the file. Similar information must be stored when either an edit or monitor request is interrupted.

Because industrial processes are extremely complex, system memory is already overburdened in many operating systems. Therefore, queuing schemes that require large amounts of dedicated memory are usually not employed. Instead, most requests within a given task are processed sequentially and, regardless of how long or short a request is, it must wait in the linked list until requests before it are completed.

In addition, where a task internal priority scheme is adopted in which high-priority is granted to the request having the shortest remaining operating time, requests requiring long periods for completion theoretically may never be processed. Moreover, a "time to completion" based priority scheme would be unworkable as the time required to complete edit and search requests cannot be determined prior to performance.

Thus, it would be advantageous to have an operating system wherein short monitor, search, and edit requests could be performed quickly without requiring large amounts of memory for storing state information corresponding to re-queued requests.

SUMMARY OF THE INVENTION

The present invention includes both a method and an apparatus for providing multitasking of a plurality of requests queued as a list in a single task of an industrial controller, each request including one or more separate segments. The requests are processed on a pseudo-non-preemptive round-robin basis wherein a single segment of a first request is performed, and, where no other requests are queued in the list, the next segment of the first request is performed. This continues until the first request has been completed or until another request or other requests, are queued in the list.

If another request is queued, the first request is performed until the end of an active segment and then is re-queued at the end of the list and completed later. While the first request is re-queued, the other request, or requests, are performed until the ends of their first segments, at which point, the second segment of the first request is performed. This process continues, the processor performing segments of queued requests on a round-robin basis until all requests have been completely performed. Importantly, requeing of request information only takes place at the end of a segment and state information necessary to describe the condition of the request at the end of each segment is minimal.

Thus, one object of the present invention is to provide a processing scheme wherein short requests can be performed quickly. By providing round-robin processing, short requests can be performed within a few passes of the list instead of waiting until after longer requests are completed. It is also important that with the queing scheme of the present invention is that processing of short requests cannot entirely block out processing of longer requests.

Another object is to limit the memory required for storing state information for requests when they are re-queued while other requests are performed. This is accomplished by interrupting long requests only at certain break or clear points at the ends of segments where required state information is minimal.

Yet another object is to achieve the above objectives without appreciably slowing processing of a request when only a single request exists in the list. By determining if other requests are present in the list prior to requeing and, where other requests are not present, continuing with the remaining segments in the first request, the first and only request in the list will be performed rapidly, without appreciable delay.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENT

Figure 1:
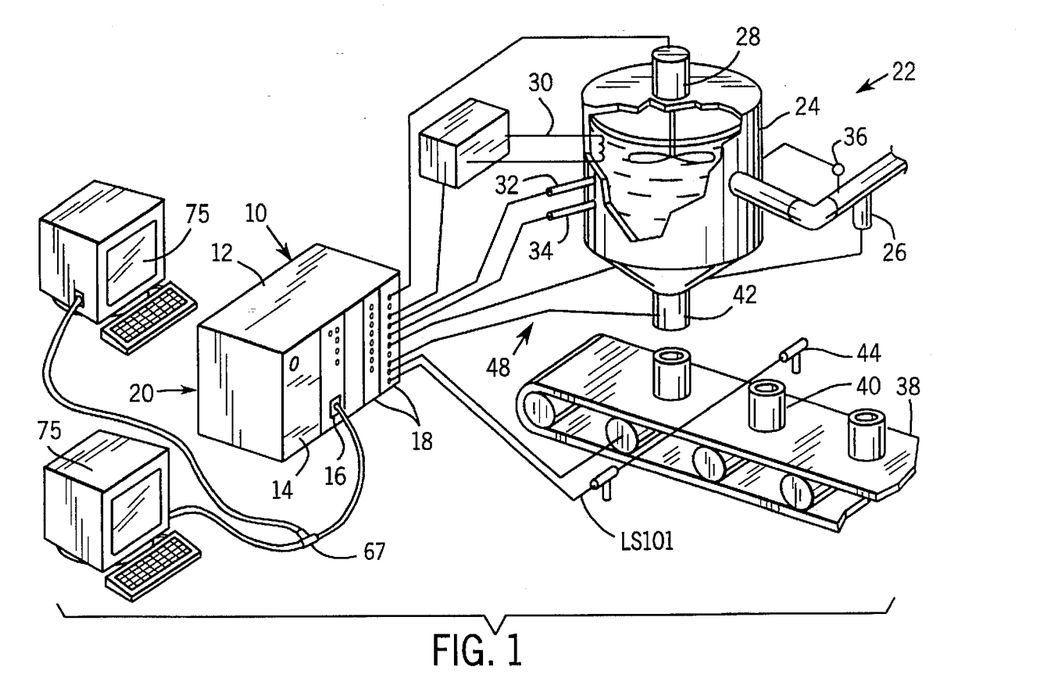
FIG. 1 is a perspective view of a hypothetical industrial control application including control of a conveyor line and a feedback process controlled by one industrial controller employing the multitasking operating system of the present invention.

Referring now to FIG. 1, the invention will be described in the context of a multitasking operating system which permits an automation controller 10 to execute with apparent simultaneity a number of different tasks associated with controlled equipment 22. In the process shown, the automation controller 10 is connected to a mixing tank 24 where it controls the flow of materials into the tank via a valve 26 and the temperature and agitation of those materials via an agitator 28 and a heater 30 under feedback control via signals obtained from a thermocouple 32, a pressure transducer 34 and a flow sensor 36. Thus the temperature of the material contained in the tank 24 may be regulated in a feedback loop by means of the thermal couple 32 and the heater 30. Likewise the flow may be regulated in a feedback loop with valve 26 and flow sensor 36. An additional feedback loop may regulate the pressure within the tank 24 as a more complex function of temperature and flow rate.

The automation controller 10 also controls, in the example, a conveyor belt 38 having containers 40 to be filled from the tank 24. The controller controls a spigot 42 from the tank 24 and the positioning of the conveyor belt 38 and receives signals from a limit switch 44 shown as a photoelectric beam so as to correctly position the containers under the spigot 42 for filling.

Figure 2:
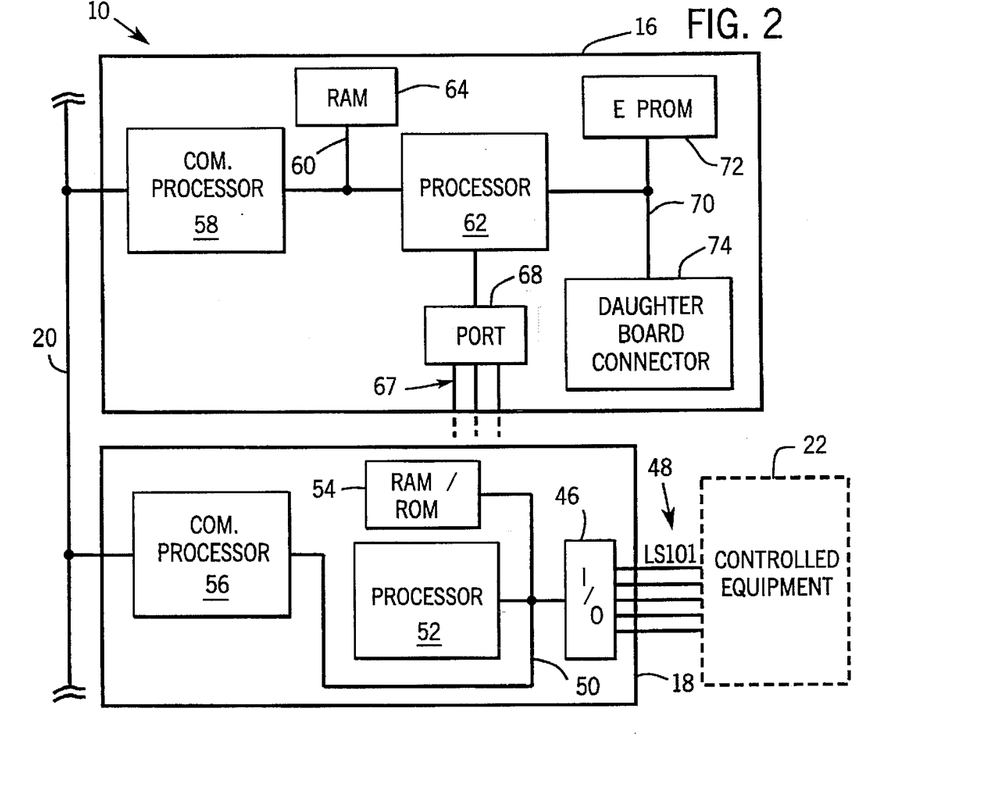
FIG. 2 is a block diagram of the controller in FIG. 1 showing the processor card, I/O card, and connection of said cards to the controlled equipment.

Referring now to FIGS. 1 and 2, an automation controller 10 includes generally a rack 12 holding one or more controller modules including a power supply 14, a controller module 16, and one or more input/output "I/O" modules 18 connected together via a backplane 20 passing along the rear of the rack 12. I/O modules such as 18 are generally known in the art and operate to receive signals and transmit them to the processor module 16 under the operation of their processor 52. The controller module 16 receives inputs from controlled equipment 22 via the input/output modules 18 and provides outputs to the controlled equipment 22 by those same input/output modules 18.

The signals from the controlled equipment 22 are received by the I/O module 18 at interface circuitry 46. The interface circuitry 46 contains protection circuitry, such as optical isolators, and conversion circuitry, such as analog to digital or digital to analog circuitry for converting the I/O signals 48 to digital representation to be transmitted on an internal bus 50 of the I/O module 18.

The internal bus communicates with an I/O module processor 52, a memory unit 54 composed generally of random access and read-only memory (RAM/ROM) and a specialized communication processor 56 connecting the I/O module 18 to a high speed backplane 20 for communication with other modules, and in particular, the controller module 16. Processor 52 thus may also receive instructions and programming from the controller module 16.

The controller module 16 includes a communication processor 58 which handles the communication protocols of the high speed backplane 20 and relays information between that high speed backplane 20 and an internal bus 60 connected to the processor 62 of the controller module 16 as well as random access memory 64. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally during operation, the processor 62, operating in accordance with the operating system burnt into the EPROM 72 as firmware, reads program instructions from the RAM 64 and transfers data to and from RAM 64 representing desired inputs and outputs interchanged by the communication processor 58 with the I/O module 18 and thus with the controlled equipment 22.

Referring still to FIGS. 1 and 2, one or more busses 67 may be connected to port 68 for providing human interface capabilities. Each bus 67 may be connected to a separate input means allowing an operator to supply requests to the processor 62 and/or receive information concerning the state of the controlled equipment 22. Preferably, the input means includes one or more computers 75 including CRTs for easy communication.

During operation of the controlled equipment 22, the processor 62 receives a plurality of different control signals from the controlled equipment 22 including, among others, signals indicating the temperature of the mixture in the tank, the state of agitation, the amount of material in the tank 24, and the position of the containers 40 below the spigot 42.

The processor 62 uses the ladder diagram program stored in RAM 64 to determine, based on the information received from the I/O module 18, how equipment must be controlled to achieve the desired process. Once these determinations are made, the processor 62 sends control signals back to the equipment 22 controlling the industrial process.

In addition, as the equipment 22 is being controlled, various operators using computers 75 may be requesting information from the processor 62 or may be editing the ladder diagram program instructions through monitor, search, and/or edit requests.

Figures 3, 13:
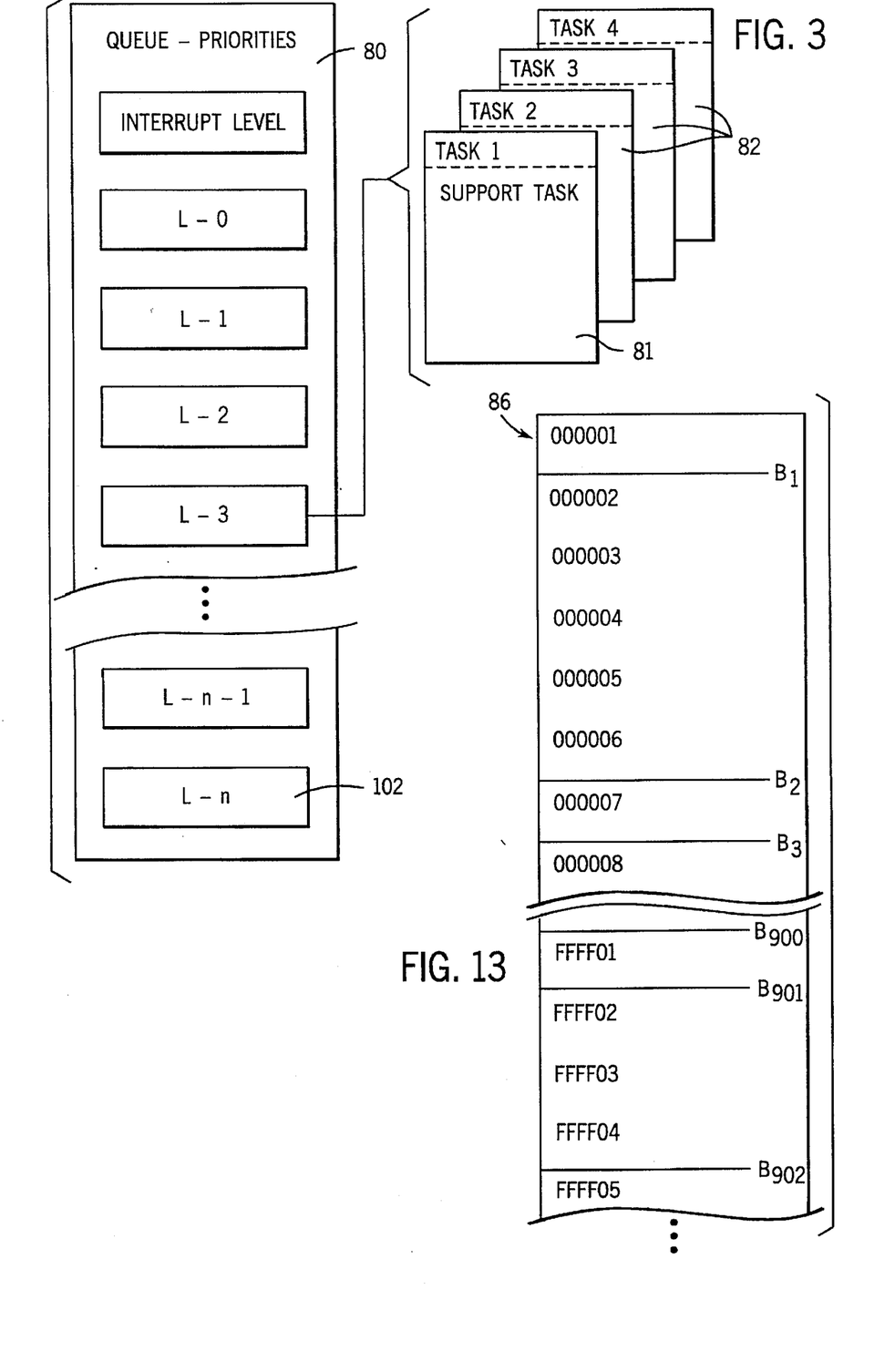
FIG. 3 is a schematic diagram of the operating system hierarchy used by the controller shown in FIG. 1.
FIG. 13 is a schematic of a ladder diagram program.

Referring also to FIG. 3, because the processor 62 can only perform a single request or task at any given time, all but a single active request or task must be queued and performed at a later time. To this end, preferably, a block of RAM 64, identified herein as a queue 80, is used for storing inactive tasks. Where a block of RAM 64 cannot be dedicated to store task information due to memory constraints, the queue 80 can be stored as a linked list as known in the art.

In most industrial processes, certain requests or tasks are more urgent than others. For example, in the illustrated process of FIG. 1, a request to determine container 40 alignment with the spigot 42 prior to opening the spigot 42 is extremely important as an untimely response could result in a spill which could possibly damage the conveyor belt 38 and other equipment therebelow.

For this reason, most industrial control queuing systems are priority based, where requests and tasks are assigned priorities and are performed in a priority based sequence, high priority requests and tasks being performed prior to low priority ones.

Referring still to FIG. 3, a typical priority scheme may have a number of different priority levels ranging from a most urgent interrupt level 101 to a least urgent nth level 102, the number of levels being dependant, at least in part, on the complexity of the process being controlled.

In all but the simplest industrial control processes, the number of different tasks is normally far greater than the number of priority levels. Thus, often many tasks are assigned the same priority. In a preferred embodiment, within each priority level, tasks are performed on a round-robin basis. Once a task begins to run, it is only stopped when it places itself in an inactive state to wait for some event or when a higher priority task needs to run. When a task stops for either of these two reasons, it is placed at the end of the list of tasks at its priority level. In this manner, tasks of equal priority constantly rotate and receive roughly equal access to the processor resource.

Referring to FIGS. 2 and 3, requests from operators input through port 68 take the form of monitor, search, and edit, requests. Because these requests are similar in nature, they are stored in a single program support task 81 which shares priority level 3 with a plurality of other tasks (Tasks 2–4) 82.

Figure 4:
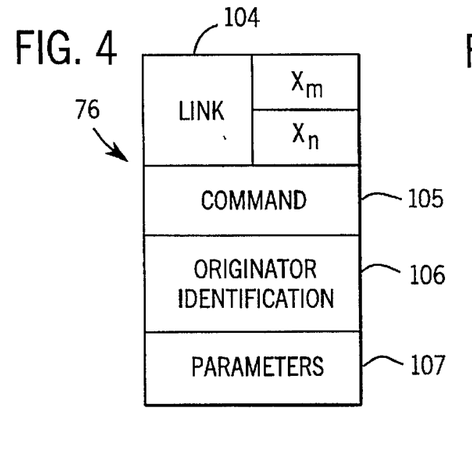
FIG. 4 is a schematic diagram of a command block according to the present invention.

Referring also to FIG. 4, each monitor, search, or edit request is stored in a separate command control block 76.

Each command block 76 includes a link field 104, command field 105, originator identification field 106, and a parameters field 107. The link field 104 stores two link addresses, a present address $x_m$ locating the command block 76 and a next address $x_n$ locating a different command block that contains information related to a request that will be processed after the request in command block 76 located at the present address $x_m$. The command field 105 identifies the type of request stored (e.g. search, edit, or monitor), the originator identification field 106 identifies which operator indicated the associated request, and the parameters field 107 stores data specifying parameters related to the stored request (e.g. in the case of a search, what addresses are to be searched and what is being searched for).

Figure 5:
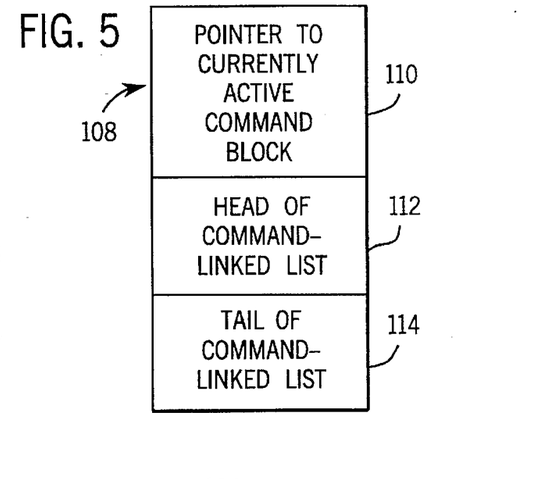
FIG. 5 is a schematic of a task control block according to the present invention.

When a new command block 76 is generated, the block 76 is stored at the end of a linked list of Command blocks associated with the program support task 81. Referring also to FIG. 5, a task control block 108 keeps track of commands within the program support task 81. An active pointer 110 keeps track of an active command block that is currently being processed. When a command block 76 is active, it is not part of the linked list. The head pointer 112, keeps track of the address relating to the first command block 76 in the linked list so that when a request being processed as an active command block is either completed or requed, the processor can access the first command block on the list for processing. The tail pointer 114 tracks the address relating to the last command block 76 in the linked list so that, when a new request is initiated or a request being processed is requed, the new or requed request can be placed at the end of the linked list for processing at a later time.

Referring again to FIG. 3, once the processor 62 performs all tasks at the priority levels interrupt, 0, 1 and 2 it then proceeds to perform the tasks at priority level 3, including the support task 81, on a round-robin basis as explained above.

When the processor 62 performs one of the support task requests (i.e. edit, monitor, search), if the request requires a particularly long time to perform, and the linked list includes other requests or other requests are received during performance of the long request, the processor 62 will re-queue the long request after partial performance and will at least partially perform other requests prior to completing the long request.

In effect, the processor 62 performs the support task requests on a round-robin basis. Importantly, however, for the purposes of the present invention, performance of a long request is only interrupted for re-queuing at specific points during performance where the state information required to identify the condition of the request is minimal.

Usually, within any long request such as a search of several hundred files or an edit to consolidate memory space, there are certain "break" or "clear" points at which the information required to identify the state of the request is minimal.

Figure 9:
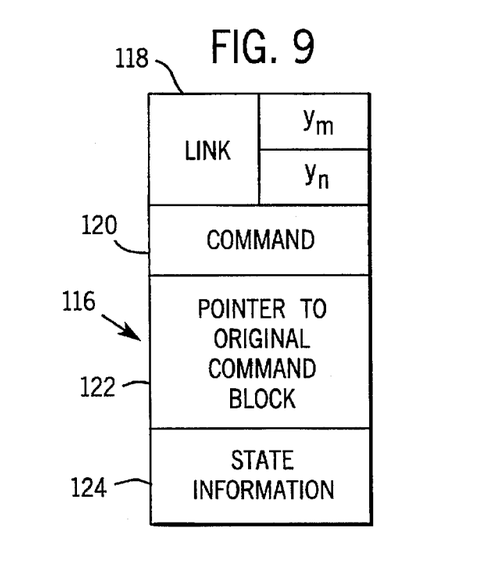
FIG. 9 is a schematic showing a state control block according to the present invention.

Referring to FIG. 9, when a request is interrupted, information relating to the state of the request at the point of interruption is stored in a state control block 116. The state control block 116 includes a link field 118 for storing the $y_m$ indicating the location of the address of the state control block 116. Other state control block fields include a command field 120 typically for restarting a requed request, an original command pointer 122 containing the address $x_m$ of the command block 76 associated with the requed request, and a state information field 124 containing data identifying the state of the requed request at the point of requeing.

When there are no requests in the program support task 81, all fields 110, 112, 114 of the task control block 100 are null. In this case, the processor 62 skips the support task 81 when it comes up in an execution sequence and processes other tasks at priority level 4.

Figure 6:
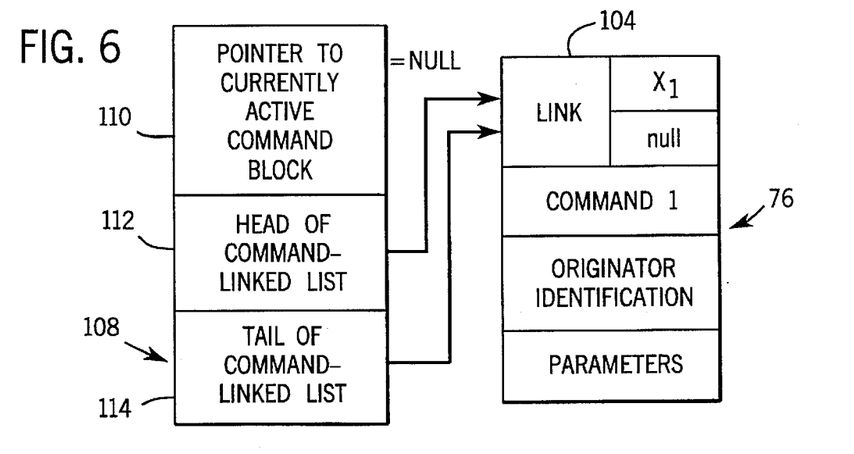
FIG. 6 is a schematic diagram showing a task control block referencing a single inactive command block.

However, referring to FIG. 6, when a first request is entered by an operator, the request is placed in a first command block 76 and linked as the first request in the linked list. At this time, all of the fields in the first command block 76 (i.e. link, command, originator, and parameters) are loaded with data identifying the request, link addresses, the originator, and parameters unique to the request. Where there is only one command block 76 in the list, both the head and tail pointers 112, 114 point to the present address $x_1$ of the single command block 76. In addition, because there are other command blocks at this time, the next address $x_n$ in link field 104 is null indicating that there is no next command block in the list. The active pointer 110 remains null until processing of the first request begins.

Figure 7:
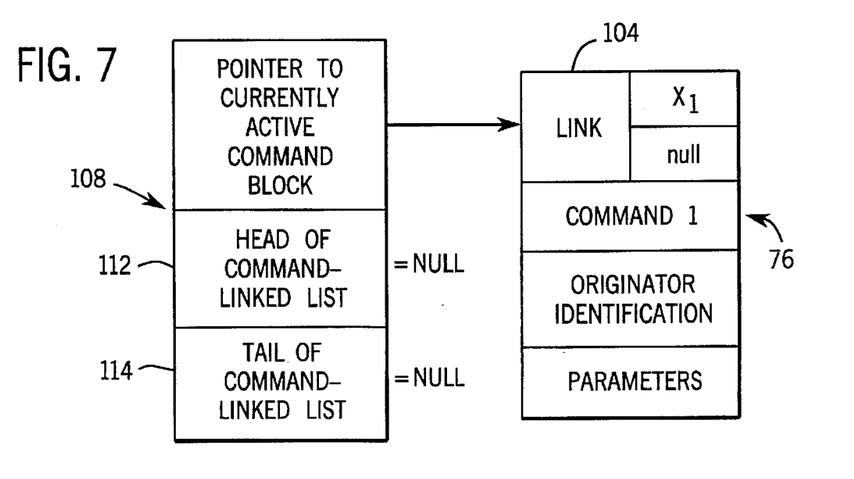
FIG. 7 is a schematic showing a task control block wherein a first command block is active.

Referring to FIG. 7, when the processor reaches the program support task for processing, the active pointer identifies the present address x of the first command block 76 in the linked list and begins processing the request stored therein. Assuming no other command blocks exist in the linked list when the first block 76 becomes active, both the head and tail pointers 112, 114 are null.

Figure 8:
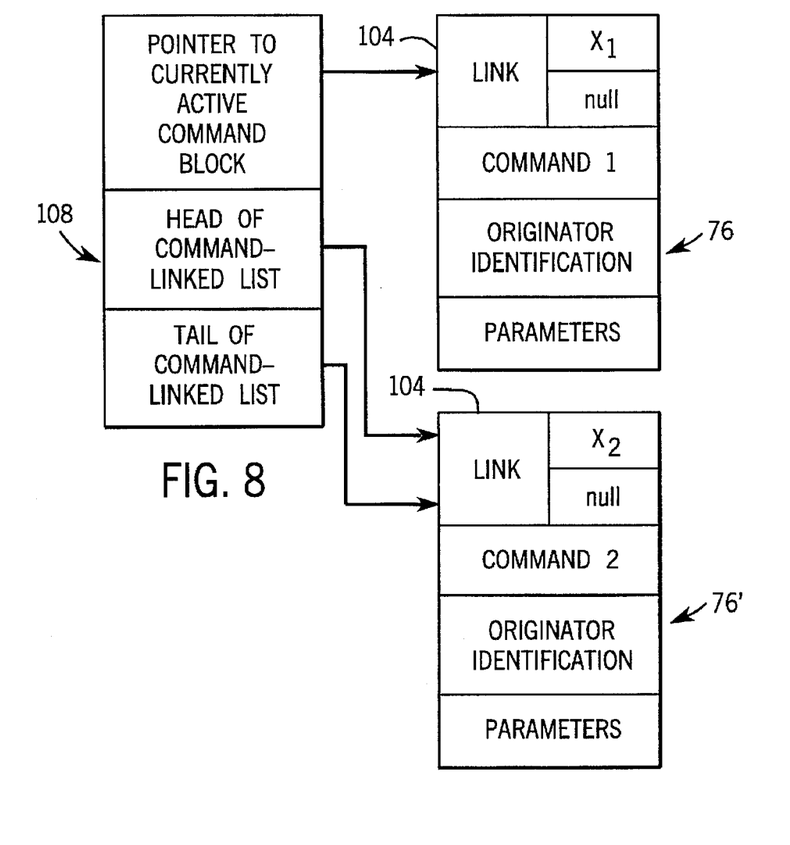
FIG. 8 is a schematic diagram showing a task control block including one active command block and one inactive command block.

Referring to FIG. 8, assuming a second request is entered while the first request is being processed, the second request is stored in a second command block 76' as a new first command block in the linked list. All fields in the second command block 76' are loaded with identifying and instructional information accordingly. At this point, the head and tail pointers 112, 114 both identify the present address $x_2$ of the second command block 76'. The second request remains unprocessed until after the first request is either completed or requed as explained in more detail below.

Figure 10:
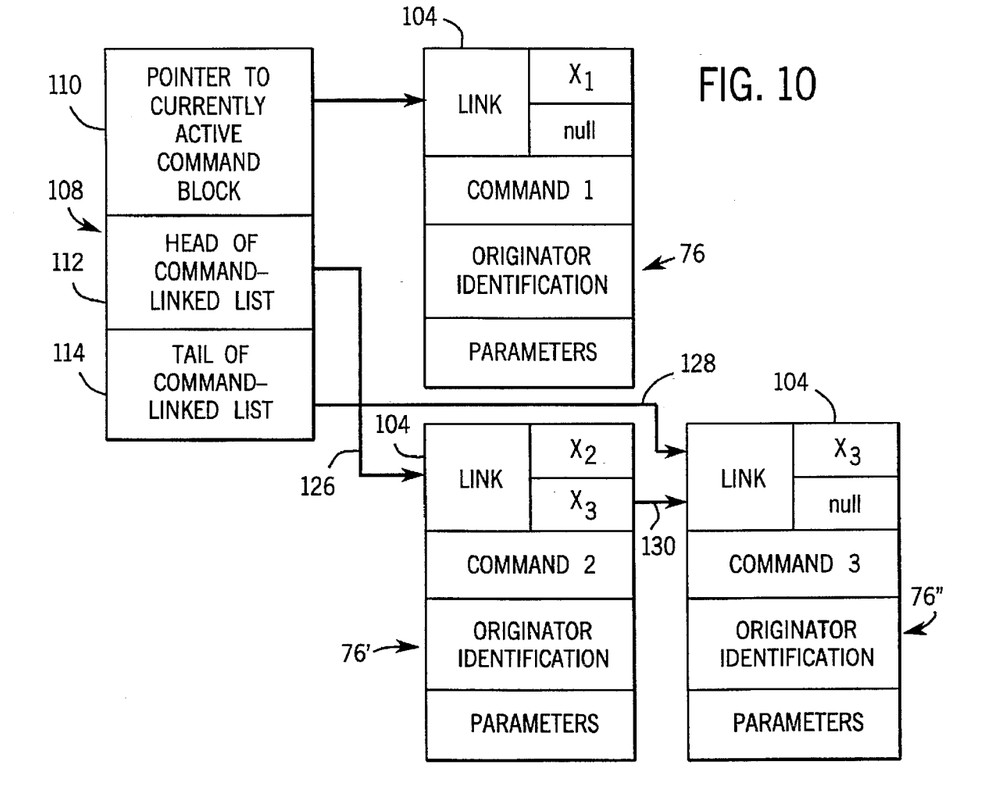
FIG. 10 is a schematic showing a task control block including one active command block and two inactive command blocks stored in a linked list.

Referring to FIG. 10, where a third request is entered while the first request is being processed, the third request is stored in a third command block 76" as a new second command block in the linked list. At this time, link address information, originator identification data, and necessary parameters related to the request are loaded into the third command block 76". The head pointer 112 continues to identify the present address $x_2$ of the second command block as indicated by arrow 126. However, the tail pointer 114 is updated to identify the present address $x_3$ of the third command block 76" as indicated by arrow 128. In addition, the next address of the second command block 76' is updated to include the address $x_3$ of the third control block 76" as indicated by arrow 130. Thus, the second and third command blocks 76', 76" form a two block linked list while the request in the first command block 76 is being executed.

Figure 11:
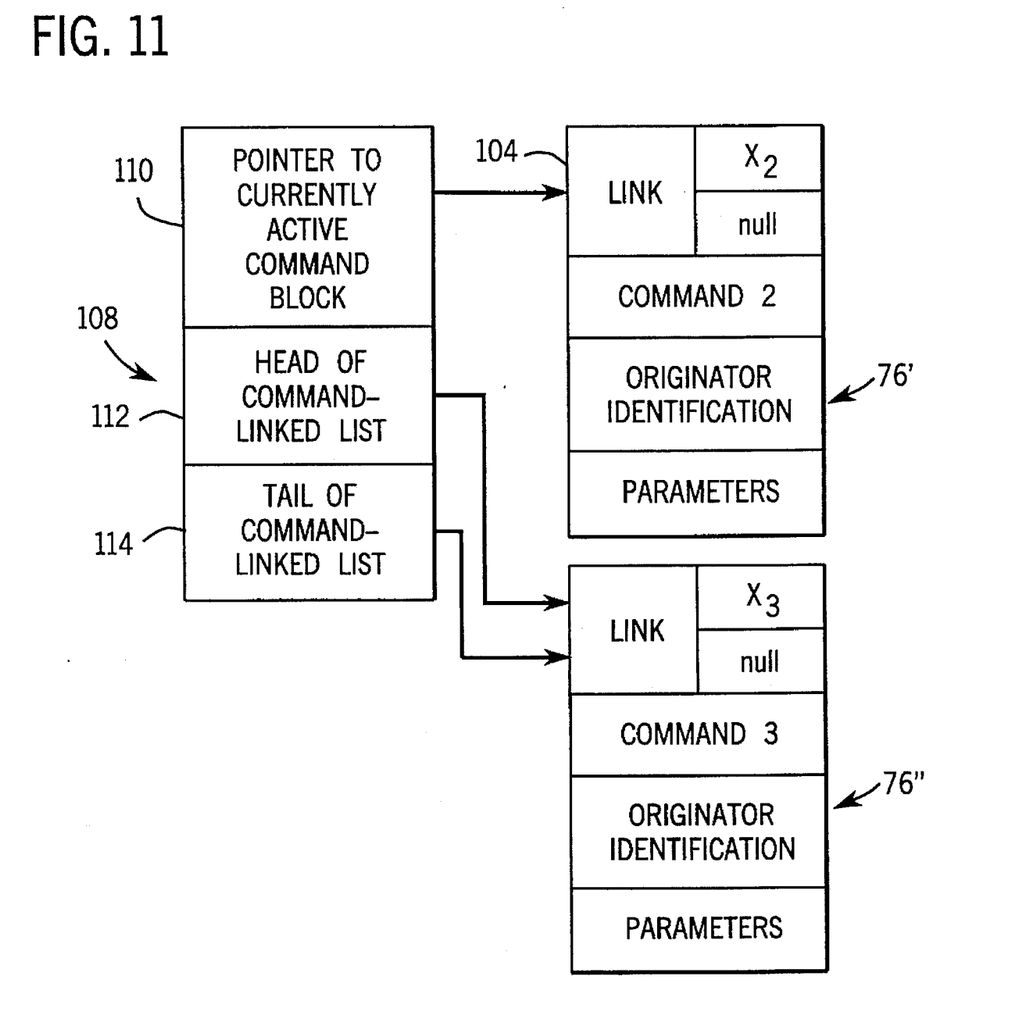
FIG. 11 is similar to FIG. 8 and is a schematic showing a task control block including one active command block and one inactive command block.

Referring to FIG. 11, where the first request is completed and the linked list includes two other command blocks 76', 76", the answer to the first request is provided to the operator that originated the request, and the first command block 76 is deleted from memory. When this happens, the task control block 108 updates the active pointer 110 to identify the present address $x_2$ of the second control block 76' and the processor 62 begins to process the second request. This removes the second control block 76' from the linked list and therefore the next address in the link field 104 is null. In addition, the task control block 108 updates the head and tail pointers 112, 114 to both identify the present address $x_3$ of the third control block 76". The third request in the third control block 76" remains unprocessed until the second request is either completed or requed.

Figure 12:
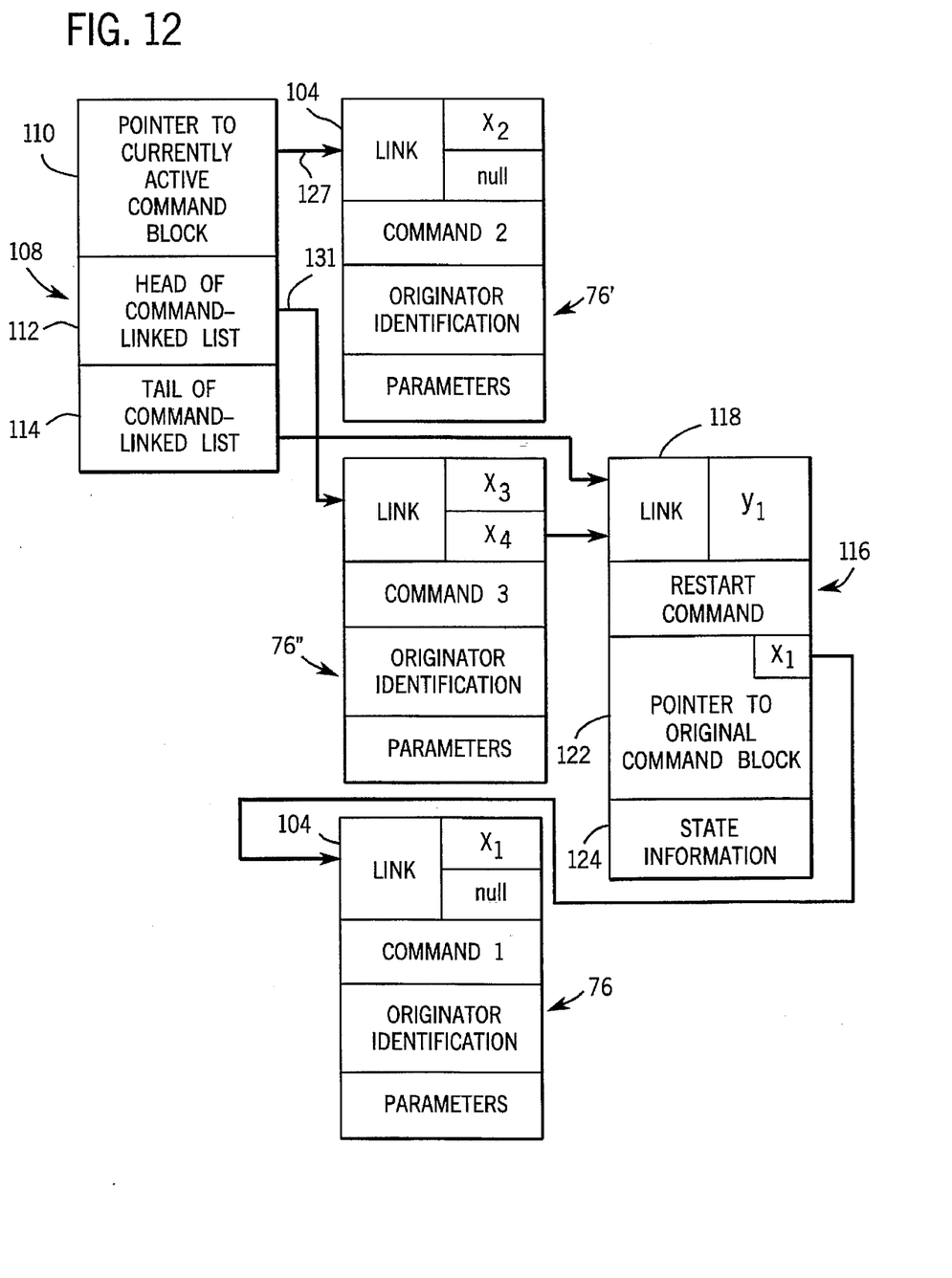
FIG. 12 is a schematic showing a task control block including one active control block, a stored control block, and a requed control block wherein the requed control block is referenced by a state control block.

Referring now to FIG. 12, when two command blocks 76', 76" are present in the linked list and an active request is requed, the active pointer 110 is updated to identify the present address $x_2$ of the second command block 76' as indicated by arrow 127 so that the processor 62 begins to execute the second request. When the second command block 76' becomes active, the head pointer 112 is updated to identify the present address $x_3$ of the third command block 76" as indicated by arrow 131. Upon requeing of the first request, the first command block 76 is stored as itself and an associated state command block 116 is generated to link the third command block 76" to the first command block 76. In other words, when requed, the first command block 76 is placed at the end of the linked list. To connect the linked list, the next address $x_4$ of the third control block 76" as well as the tail pointer 114 of the task control block 108 are updated to identify the address $y_1$ of the state control block 116. In addition, the original command pointer 122 of the state control block 116 is set to identify the present address $x_1$ of the first command block 76.

Hence, after the processor completes processing of at least a portion of each of the requests stored in the second and third command blocks 76', 76", the processor will encounter the state command block 116 which will transfer the first command block 76 into the active mode to be processed further.

The processor 62 continues to process the requests in the command blocks 76, 76', 76" in a round-robin fashion, requeing requests regularly when beneficial as described below. When any request is requed, the first request in the linked list becomes active and is processed, and a state command block is generated to identify the requed request and associated information. The newly generated state command block and associated command block are queued at the end of the linked list for processing after other requests are at least partially processed. This process continues until all of the requests in the task control block are completed or until a command having a priority level of 0, 1 or 2 preempts the program support task 81. When preempted, the active request in the program support task 81 is requed at the end of the linked list as described above.

Referring now to FIG. 13, a first request in a hypothetic linked list may require a search of a ladder diagram program 86 for the next occurrence of the address 00FF. Referring also to FIG. 1, 00FF might be the beginning of a subroutine to add additional mixture to the tank 24 by opening valve 26. Prior to performing this search, there is no way to determine how long it will take to perform the entire search as the next occurrence of 00FF could be at any point in the ladder program 86.

Hypothetical data to be searched during the first request includes memory locations beginning with address 000001. Within a ladder diagram program 86, break points ($B_1$, $B_2$, $B_3$ ... ) occur periodically. By interrupting the search at one of these break points, the memory requirement to store request identifying information is minimal. All that needs to be stored is the last address searched and the original search request information.

In a search request, break points $B_n$ may take place at the end of each rung in a ladder diagram program. In an edit request, where a program is being consolidated into a smaller block of RAM, a break point $B_n$ may occur after one portion of the program has been moved while other portions still remain in their original positions.

Referring to FIGS. 2 and 13, to carry out a first search request beginning at address 000001, the processor 62 searches until the first break point $B_1$ is reached. In FIG. 13, the first break point $B_1$ is at the end of address 000001. At this point, the processor 62 determines whether or not 00FF has been located. If so, the address of the location is provided to the operator that made the request.

If 00FF has not been located, the processor 62 determines if there are other command blocks in the linked list. If no other command blocks exist in the linked list 77, the processor 62 continues to perform the first request, searching from the address following the last address searched. In this case the search would continue at address 000002. In FIG. 13, this search would continue until the second break point $B_2$ therein is reached after address 000006. At that point, the processor 62 again determines if 00FF has been located, responding to the operator if it has been located and moving on if it has not.

At any break point $B_n$ where the processor 62 responds to an operator indicating that 00FF has been found, after responding, the first search request is terminated and the processor moves on to perform the next request stored in the second command block. As seen in FIG. 11, when this happens, the second command block 76' is identified by the active pointer and all other command blocks (i.e. 76") effectively move up in the linked list.

Where 00FF is not found prior to a break point $B_n$ and other command blocks are queued in the linked list, the processor 62 re-queues the first search request as indicated in FIG. 12. Referring to FIG. 12, assuming the last address searched was 000006 (i.e. to $B_2$), when the first request is re-queued, the state information field 124 would be updated with address 000007. The first request is, in effect, placed at the end of the linked list, to be performed again, after other requests in the list are at least partially performed.

Eventually, the processor 62 passes through the linked list once, completing some of the requests and parts of others. After operators receive responses to completed requests, the completed requests are deleted from the linked list and the head pointer 112, tail pointer 114, and link addresses are updated to maintain the integrity of the linked list.

Where the break points $B_n$ are located is a matter of design choice. For example, the processor 62 could be programmed to interrupt a search request at each break point in the ladder diagram program. In the alternative, the processor could interrupt the search request after ten or twelve break points in the ladder diagram program. The only limitation is that the break occur at the end of a rung or program segment, where state information is minimal as opposed to the middle of a rung where such information is more complex.

A simple and reliable operating system has been described wherein short monitor, search, and edit requests can be performed quickly prior to other requests queued in the same support task without requiring large amounts of memory for storing state information.

In effect, a bi-level operating system has been described wherein a first level is priority based and the second level is governed by a pseudo-round-robin sequence that allows all requests in a single priority task to be processed seemingly in parallel while using minimal memory space for storing state information. This is clearly different than a conventional round-robin preemptive system where task processing is interrupted on a time slice basis where state information that must be stored is excessive.

It should be understood that the above-described embodiments are simply illustrative of the principles of this invention. Various other modifications and changes may be made by those skilled in the art which will embody the principles of the invention and fall within the spirit and the scope thereof. For example, while the present invention has been described in the context of a single support task, it clearly could be used with other multi-request tasks, even where a human operator is not involved. In addition, while it is preferable to break the requests into small sections, any size section where minimal state information is required to identify the state of a request could be used. Moreover, while the description above details a method best implemented in software, it is contemplated that separate hardware could be used to practice the invention.

In order to appraise the public of the various embodiments that may fall within the scope of the invention, the following claims are made:

I claim:

1. A method of providing multitasking of a plurality of separate requests queued as a list in a single task in an industrial controller having a processor, each request including one or more separate segments to be executed in sequential order, the segments executed in a sequence comprising the steps of:
   (a) determining a plurality of break points at which the quantity of state information is minimal, each break point located at the end of a segment;
   (b) executing the segments of a given request from a start segment until a break point is reached;
   (c) storing state information relating to the state of the given request at the break point at the end of the list, the state information including the next segment of the given request after the break point;
   (d) retrieving state information from the list corresponding to the next request, the state information including a next segment of the next request, the next request following the given request in the list;
   (e) repeating steps (b) through (d) with the next request as the given request and the next segment of the next request as the start segment; and
   (f) repeating step (e) for each of the plurality of requests wherein the following segment after the start segment at step (e) is identical to the next segment stored at step (c) for the given request after the previous execution of the request at step (b).

2. The method as recited in claim 1 further including the steps of, prior to storing state information, determining if the given request has been fulfilled and, if the given request has been fulfilled, replying to the given request, clearing the request from the queue, and skipping to step (d).

3. The method as recited in claim 2 wherein the single task is one of a plurality of tasks on one of a plurality of priority levels, and wherein the tasks on the same level are scheduled for round-robin execution and tasks on high levels are executed in a preemptive fashion prior to tasks on lower levels, the method further including the step of, prior to skipping to step (d), determining if there are other requests in the list and, if there are no other requests, passing control of the processor to some other task for execution.

4. The method as recited in claim 3 wherein the other tasks also include requests queued for execution according to steps (a) through (f).

5. The method as recited in claim 1 wherein the requests are monitor, edit, and search requests.

6. The method as recited in claim 1 further including the steps of, prior to storing state information, determining if there are other requests in the list and, if there are no other requests, repeating the method beginning with step (b) with the given request and the next segment of the given request after the execution of the request up to the break point as the start segment.

7. The method as recited in claim 1 wherein steps (b) through (f) are repeated until all of the segments of all of the requests are executed.

8. An apparatus for use in industrial control for executing a plurality of separate requests queued as a list in a single task, each request including one or more separate segments to be executed in sequential order, the apparatus comprising:
   (a) a first calculator for determining a plurality of break points at which the quantity of state information is minimal, each break point located at the end of a segment;
   (b) a second calculator for executing the segments of a given request from a start segment until a break point is reached;
   (c) a scheduler for storing state information relating to the state of the given request at the break point at the end of the list, the state information including the next segment of the given request after the break point;
   (d) a retriever for retrieving state information from the list corresponding to the next request, the next request following the given request, the state information including a next segment of the next request; and
   (e) a loop returning execution of the requests to the second calculator with the next request as the given request and the next segment as the start segment, the loop returning execution to the second calculator until all of the segments of all of the requests have been executed.

9. The apparatus as recited in claim 8 further including a third calculator, after the second calculator, for determining if the given request has been fulfilled, and, when the given request has been fulfilled, a clearer for clearing the request from the queue, and a responder for responding to the given request.

10. The apparatus as recited in claim 8 further including a fourth calculator connected to the second calculator for determining if there are other requests in the list and a second loop passing control of request execution back to the second calculator with the next segment of the given request, after execution of the request up to the break point, as the start segment if there are no other requests.

11. The apparatus as recited in claim 8 wherein the requests are monitor, edit, and search requests.

12. A method of providing multitasking of a plurality of separate requests queued as a list in a single task in an industrial controller having a processor, each request including one or more separate segments to be executed in sequential order, the segments executed in a sequence comprising the steps of:
   (a) determining a plurality of break points at which the quantity of request state information is minimal, each break point located at the end of a segment;
   (b) executing the segments of a given request from a start segment until a break point is reached;
   (c) determining if the given request has been fulfilled;
   (d) if the request has been fulfilled:
      (i) replying to the request;
      (ii) clearing the request from the list; and
      (iii) skipping to step (f);
   (e) if the request has not been fulfilled, storing state information relating to the state of the given request at the break point at the end of the list, the state information including the heft segment of the given request after the break point;

(f) retrieving state information from the list corresponding to the next request following the present request, the state information including a next segment of the next request;

(g) repeating steps (b) through (f) with the next request as the given request and the next segment as the start segment; and (h) repeating step (g) for each of the plurality of requests wherein the following segment after the start segment at step (f) is identical to the next segment stored at step (e) for the given request after the previous execution of the request at step (b).

13. The method as recited in claim 12 further including the steps of, prior to storing state information, determining if there are other requests in the list and, if there are no other requests, repeating the method beginning with step (b) with the given request and the next segment of the given request after the execution of the request up to the break point as the start segment.

14. The method as recited in claim 12 wherein the requests are monitor, edit, and search requests.

* * * * *